United States Patent
Tafoya et al.

(10) Patent No.: US 7,168,523 B1
(45) Date of Patent: Jan. 30, 2007

(54) MECHANIC'S STEP WITH STIRRUP

(76) Inventors: Craig A. Tafoya, 2107 Mariner Dr., Ft. Lauderdale, FL (US) 33316; Mary E Tafoya, 2107 Mariner Dr., Fort Lauderdale, FL (US) 33316; Samuel Barran Tafoya, 135-41st St. Circle East, Bradenton, FL (US) 34208

( * ) Notice: Subject to any disclaimer, the term of this patent is extended or adjusted under 35 U.S.C. 154(b) by 0 days.

(21) Appl. No.: 11/374,606

(22) Filed: Mar. 14, 2006

(51) Int. Cl.
*B60R 3/00* (2006.01)

(52) U.S. Cl. .................. 182/150; 182/206; 280/165
(58) Field of Classification Search .............. 182/90, 182/92, 150, 206; 280/165
See application file for complete search history.

(56) References Cited

U.S. PATENT DOCUMENTS

| | | | |
|---|---|---|---|
| 868,115 A * | 10/1907 | Oliva | 182/90 |
| 2,176,772 A | 10/1939 | Smith | |
| 2,378,678 A | 6/1945 | Anderson | |
| 2,575,503 A | 11/1951 | Warren | |
| 2,848,150 A | 8/1958 | Tans | |
| 2,973,052 A | 2/1961 | Miller | |
| 3,078,952 A * | 2/1963 | Kelling | 182/150 |
| 3,158,223 A * | 11/1964 | Ronald | 182/36 |
| 3,374,859 A * | 3/1968 | Dobert | 182/92 |
| 4,312,536 A * | 1/1982 | Lloyd | 4/559 |
| 4,782,916 A | 11/1988 | Hays | |
| 4,947,961 A | 8/1990 | Dudley | |
| 5,111,909 A | 5/1992 | Liu | |
| 5,133,429 A | 7/1992 | Densley | |
| 5,244,058 A * | 9/1993 | Carlson et al. | 182/92 |
| 6,957,719 B2 | 10/2005 | Ehnes | |

* cited by examiner

*Primary Examiner*—Alvin Chin-Shue
(74) *Attorney, Agent, or Firm*—Dorothy S. Morse

(57) ABSTRACT

A suspended step assembly that is attachable over the tire of a motor vehicle and which can support a mechanic working in the engine compartment. It has a frame that can be broken down into sub-parts for compact storage in a motor vehicle, is easy and fast to assemble and disassemble, is adjustable to differing tire widths, has an upper configuration that securely hooks over the top of the tire, has a strong and simple closed-loop tubular structure that resists parallelogram deforming while under load, has a step that is secured into a fixed position on the frame without fasteners, and has a bottom stirrup under its step. Applications may include, but are not limited to, use by mechanics to more easily and efficiently perform engine work, and use by those needing to clean or otherwise have access to the upper portions of high-profile vehicles.

20 Claims, 2 Drawing Sheets

MECHANIC'S STEP WITH STIRRUP

CROSS-REFERENCES TO RELATED APPLICATIONS

None

BACKGROUND

1. Field of the Invention

This invention relates to the fields of seats, scaffold supports, and steps that can be suspended from the wheel of a motor vehicle, specifically to a suspended step and frame assembly that is attachable over the tire of a motor vehicle and which can support a mechanic during work in the engine compartment with the mechanics feet positioned approximately mid-tire. It can be broken down into sub-parts for compact storage in the motor vehicle with which it is used, and it is easy to assemble and disassemble. Quick-release fasteners allow for fast assembly and disassembly, as well as adjustability for differing tire widths and steps of differing depth dimension, as needed in differing applications. Further, the present invention has an upper configuration that can be securely hooked over the top of the tire by providing horizontal engagement with the rear surface of the tire, wherein the upper configuration cannot be dislodged from its usable position in response to a large weight/load being placed upon the step. In addition, the present invention has a strong and simple closed-loop tubular structure that resists parallelogram deforming while under load, a bottom stirrup under its step which can optionally be employed to help some users safely move up onto the step, and a step that can be rapidly and promptly secured into a fixed position on the frame without fasteners directly connected between the step and the frame. Applications may include, but are not limited to, use by mechanics for engine work and use by those needing to clean or otherwise have access to the upper portions of high-profile vehicles, as well as luggage racks and other accessories attached over the roofs of high-profile and other motor vehicles.

2. Description of the Related Art

Many mechanics' steps are known. The invention disclosed in U.S. Pat. No. 2,176,772 to Smith (1938) shows a scaffold support having two spaced-apart inverted U-shaped members with arms that are substantially the same length and fit over the top of a vehicle tire so that one arm of each inverted U-shaped member engages the front surface of the tire while the other arm thereof engages the rear surface of the tire. Three horizontally-extending braces join together the two front arms of the inverted U-shaped members, and a V-shaped piece extends outwardly from the top brace in a direction remote from the tire. The two rear arms of the inverted U-shaped members are not joined to one another. An adjustable ground support is connected to the web portion of the V-shaped piece. Thus, when two or more Smith inventions are simultaneously used on tires positioned on the same side of a motor vehicle, a plank can be supported horizontally across the V-shaped members. The present invention is different from the Smith invention in that the present invention has a simple closed-loop tubular structure which requires no welding or fabrication, only bending, which can be simply accomplished. Further, the upper end of the closed-loop structure has a configuration that securely hooks over the top of the tire and horizontally engages the tire's rear surface so that it cannot be dislodged from its usable position in response to a large weight/load being placed upon the step that is firmly secured elsewhere on the present invention frame. In addition, the bottom end of the present invention closed-loop frame provides a stirrup for use by anyone needing assistance in safely reaching the present invention step, with or without an armload of tools, engine parts, and/or other equipment. There are no front braces which horizontally-extend across the portion of the present invention to engage the front surface of a vehicle tire. Instead, contact with the front surface of a vehicle tire is provided by the vertically-extending portions of the present invention frame located above the step. In addition, the present invention has quick-release fasteners that allow it to be adjustable to multiple tire widths, as well as to steps of differing depth dimension, and its step/plank has elongated holes or slots through which the frame structure is inserted for secure fastening of the step into a fixed usable position without fasteners directly connected between the step and the frame. Similarly, the portable step for vehicle repair in U.S. Pat. No. 2,378,678 to Anderson (1945) is also mounted upon a vehicle tire by two U-shaped upper portions joined by a horizontally-extending front brace that engages the front surface of a vehicle tire. Also similar to the Smith invention, no rear connecting member is present between the U-shaped upper portions of the Anderson invention to engage the rear surface of the vehicle tire when a weight/load is placed upon the associated step and thereby prevent the U-shaped upper portions from becoming unseated from its usable position on top of a vehicle tire. Different from the Smith invention, the part of each U-shaped upper portion in the Anderson invention that is positioned adjacent to the exposed side of a vehicle tire has an elongated downwardly-extending configuration ending in a forwardly-extending distal portion that supports a removable step. Further, the Anderson step is secured in place with vertically-extending fasteners, and a laterally-extending stabilizing member is present on each side of the step. Also, the Anderson invention is not adjustable to larger tires, only limited tires sizes. The U-shaped upper portion of the Anderson invention is not adjustable for differing tire widths, and it is not able to be as rapidly disassembled for compact storage and reassembled for use as is the present invention. The invention in U.S. Pat. No. 2,575,503 to Warren (1948) uses an upper handle-bar approach to support it from the top of a vehicle tire. It also has a single elongated and downwardly-extending support piece from which its step is secured, and laterally-extending stabilizing members present on each side of its step that resemble structure in the Anderson invention. The configuration of the handle bar upper portion of the Warren invention appears to be more easily dislodged from the top portion of a vehicle tire than the configuration of the upper portion of the present invention which has a rear connecting member that engages the back inside surface of the tire. Also, the Warren invention is not adjustable for differing tire widths as is that of the present invention, it does not have the convenient stirrup of the present invention below its step that is needed for present day super-sized tires, and the Warren step rests upon its frame and does not appear to be separable from it, in contrast to the present invention which has its frame secured through elongated holes or slots in its step that allows for quick removal of the step for storage and obviates the need for fasteners to hold the step in place. The inventions disclosed in U.S. Pat. No. 2,848,150 to Tans (1955) and U.S. Pat. No. 2,973,052 to Miller (1961) are similar in appearance, however, each has structure different from the present invention. Although the step in Tans has holes through which the frame is inserted without fasteners, the distal end of the frame does not underlay the step for added strength and security. Further, the Tans invention has a front brace between its U-shaped supports that is not duplicated in the present invention and the present invention has a rear connecting member not present in the Tans structure. In addition, the Tans invention has no upper adjustability for differing tire widths and no stirrup below its step. Further, the Tans invention step is attached via an interference fit to the frame, which can slip when it becomes worn and cause user injury. Although the vertical height of the Miller step can be raised and lowered, perhaps obviating the need for the present invention stirrup, the capability of the step for being raised and lowered makes it less strong than the step structure used in the present invention where the frame is inserted through elongated holes or slots in the rear portion of the step and underlies it. Further, the Miller invention has no upper adjustability for differing tire widths and its structure is subject to parallelogram deforming while under load. The invention disclosed in U.S. patent to Dudley (1990) is adjustable in vertical length so that the step can be raised and lowered according to need. Also, its upper portion is adjustable for differing tire widths and it has a strap that encircles the lower portion of the tire. However, the number of holes shown in FIG. 1 for tire width adjustment appears to comprise the structural integrity and strength of the materials used. Also, while the number of holes in horizontally-extending members 43 and 44 appear to create a large amount of tire width adjustability, the corner piece 46 appears to only be a few inches long and limits adjustability only to the actual amount of the horizontally-extending members 43 and 44 that can fit therein, unless horizontally-extending members 43 and 44 extend through corner pieces 46, which is not ideal as it would place the user at risk for possibly contact with the extended ends and injury. The structure of the present invention is different from the Dudley invention in material ways. The present invention has a stirrup below its step, no strap, and a frame that underlies its step making a simpler and stronger structure than is disclosed by the Dudley invention. Similarly, in contrast to the present invention, the invention in U.S. Pat. No. 4,782,916 to Hays (1988) does not have a frame that inserts through and underlies its step, the invention in U.S. Pat. No. 5,111,909 to Liu (1992) has too many parts, the number of holes used in square tubing compromises its strength and makes it weak, and its upper structure has a configuration that could easily come off the top portion of a vehicle tire when a heavy load is placed upon its step. Further, although the invention in U.S. Pat. No. 6,957,719 to Ehnes (2005) folds into a compact configuration for storage, its pivot is weak and could shear off should its associated step become overloaded with weight. In addition, the invention disclosed in U.S. Pat. No. 5,133,429 to Densley (1992) has more parts than the present invention and is welded and fabricated, wherein the four present invention frame parts are easily bent and its fastener holes rapidly drilled via automated means. Thus, the Densley invention is more expensive to manufacture than the present invention. Also, the Densley invention has a structure that is not as strong as that of the present invention to hold the weight of a large person, its small braces are inadequate for their intended function, its top is not configured to be as securely positioned over the top of a vehicle tire as the present invention, it has no stirrup, and its frame is not secured through elongated holes in the rear portion of its step. In contrast, the present invention has simple and low cost construction, and it can be broken down into sub-parts for compact storage in the motor vehicle with which it is used, perhaps being stored behind the front seat in a trunk cab when it is not needed for use. Further, it is easy and fast to assemble and disassemble, it is adjustable to differing tire widths, it has an upper configuration with a rear connecting member that securely hooks over the top of the tire and cannot be dislodged therefrom, its strong and simple closed-loop tubular structure resists parallelogram deforming while under load, it has a bottom stirrup under it step for added convenience and ease of access by a user to the step, and it has a step that is secured into a fixed position without fasteners wherein a portion of the frame extends through elongated holes or slots in the rear portion of the step. No other mechanic's step is known that has the same structure and features as the present invention, or all of its advantages.

BRIEF SUMMARY OF THE INVENTION

The primary object of this invention to provide a suspended step that can be used securely over the tire of a motor vehicle and can be broken down into sub-parts for compact storage. Another object of this invention is to provide a suspended step that is simple in design for cost efficient manufacture. It is a further object of this invention to provide a suspended step that has a stirrup below its step for added user convenience and ease of access to its step. It is also an object of this invention to provide a suspended step that has sturdy design and construction. A further object of this invention is to provide a suspended step that is easy and fast to assemble and disassemble.

The present invention, when properly made and used, will provide a step that can be securely fixed over the top of a vehicle tire for user access to the engine compartment for inspection, repair, and maintenance purposes, or access to the upper portions of high-profile vehicles for cleaning, inspection, access to roof-mounted luggage racks, and other purposes. It has a strong tubular closed-loop construction, with a step having two elongated lateral openings through which the frame is passed for a secure and non-slip positioning of the step during its use, as well as fast mounting and disassembly without fasteners directly secured between the step and the frame. The frame separates in four places for disassembly into four compactly storable sub-parts. Present invention frame separation also permits tire width adjustment and rapid step positioning during assembly. Although it is preferred for a pin and clip combination to be used for each connection of adjacent portions of the present invention closed loop frame, such a connection is not critical and, although not shown, it is also contemplated for other quick-release and non-slip fasteners or fastener assemblies to also be used. However, what ever fastener means is used, it should be easily removable by hand and without the use of tools. The portion of the frame extending front-to-back laterally under the step may also be adjustable in depth, so as to permit the use of steps with differing depth dimension. Although the stirrup height is not user adjustable, during manufacture various embodiments of the present invention may be given stirrups with differing height dimensions for special applications. Further, the present invention has an upper configuration that securely hooks over the top of a vehicle tire with a rear connecting member and cannot be dislodged from its usable position when a large weight/load is placed upon its step, and its strong closed-loop tubular structure resists parallelogram deforming while under load. The goal of low cost manufacture in the present invention is met by its simple design and the few parts needed. In addition, it is preferred for the present invention to have an elongated notch centrally in its rear surface configured to clear the lug nuts used to mount the vehicle wheel/tire in place. No other mechanic's step is known that has the same structure and features as the present invention, or all of its advantages.

The description herein provides preferred embodiments of the present invention but should not be construed as limiting its scope. For example, variations in the number of adjustment holes used in the upper portion of the tubular frame; the diameter dimension of differing portions of the tubular frame; the depth dimension of the step used; the height dimension used for the stirrup; and the configuration and length dimension of the pins used to connect adjoining portions of the frame; other than those shown and described herein, may be incorporated into the present invention. Thus the scope of the present invention should be determined by the appended claims and their legal equivalents, rather than being limited to the examples given.

DETAILED DESCRIPTION OF PREFERRED EMBODIMENTS

Figure 1:
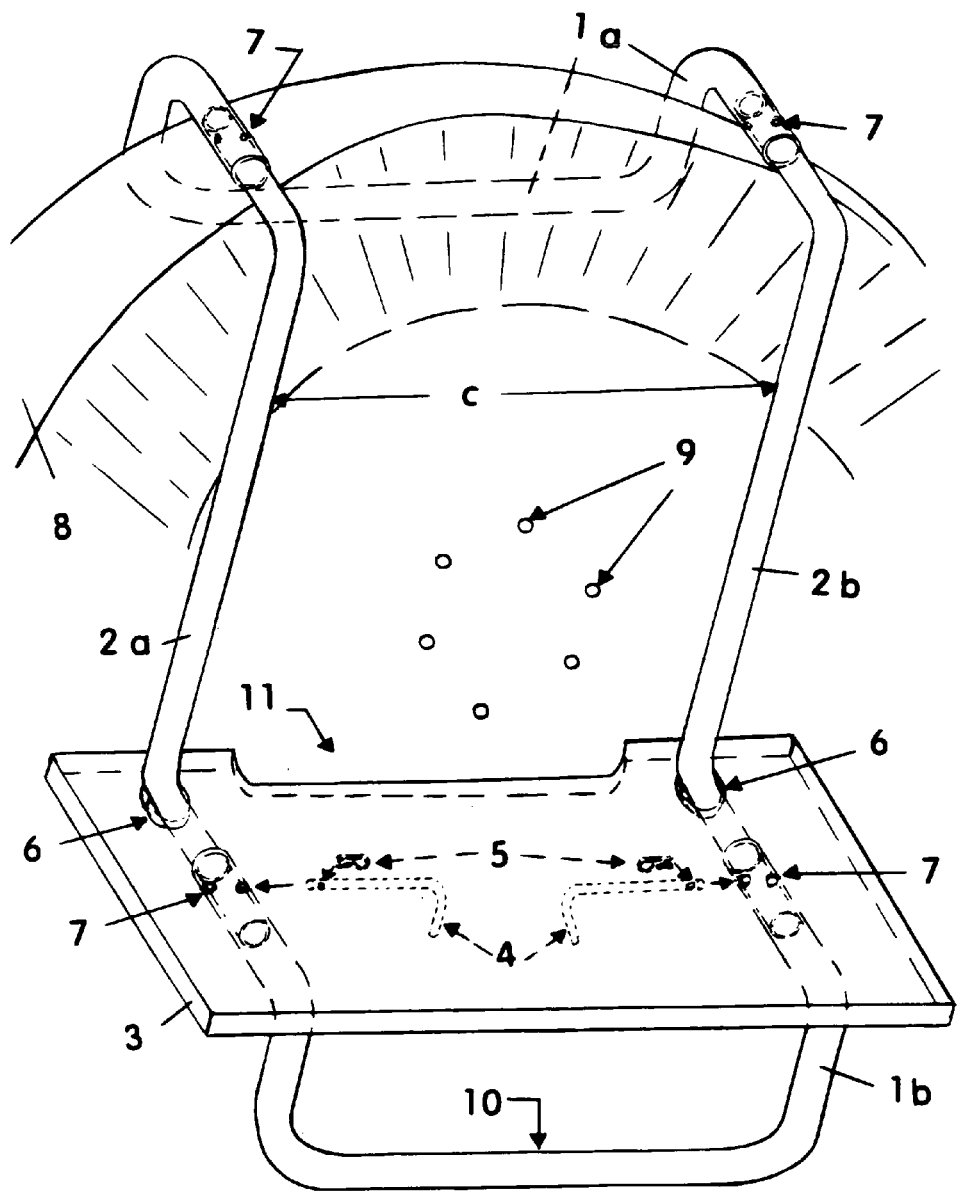
FIG. 1 is a perspective view of the most preferred embodiment of the present invention having a closed loop tubular frame in its usable position mounted upon a motor vehicle tire, the top of the frame being adjustable for differing tire widths and the frame being separable into several pieces for compact storage, the present invention also having a step supported upon a portion of the tubular frame with an elongated notch or cutout area on its rear surface configured for wheel nut clearance, the step also having two lateral slots through which the tubular frame is inserted after which adjoining parts are secured with fasteners under the step, and the frame further extending below the step to form a stirrup to assist a user in mounting the step.
Figure 2:
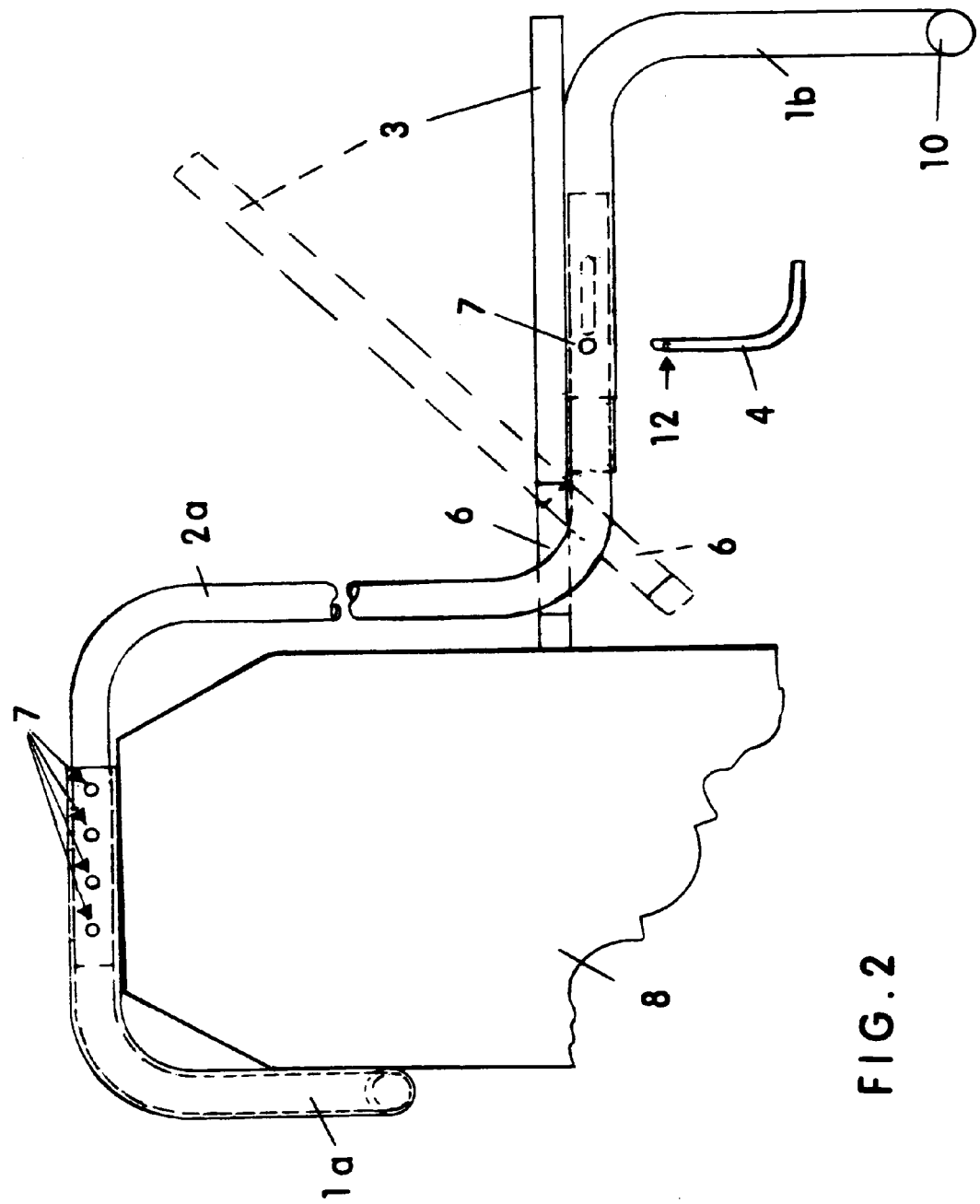
FIG. 2 is a side view of the most preferred embodiment of the present invention secured over a motor vehicle tire and held in place by contact of the upper portion of the tubular frame with the tire, as well as contact of the rear portion of the step with the lateral portions of the tire, and the step being shown in two positions, with the solid lines showing its usable position and the broken lines showing the position of the step needed for insertion of the tubular frame through its two lateral slots.

The present invention provides a suspended step 3 that is configured for attachment over the top of the tire 8 of a motor vehicle (not shown) and which can support a mechanic (not shown) working in the vehicle's engine compartment. It has a closed-loop tubular frame (components 1a, 1b, 2a, and 2b) that can be broken down into sub-parts for compact storage in the motor vehicle with which it is used. It further has top frame member 1a configuration with a rearwardly directed portion and a downwardly directly portion, separated by a right angle bend, that together securely hook the frame over a tire 8 and at least one pair of bores 7 therethrough on its rearwardly directed portion that permits the present invention to be adjustable to differing tire 8 widths. Also, a substantially vertically-extending left side frame member 2a downwardly depends from the top frame member 1a configuration, a substantially horizontally-extending right side frame member 2b downwardly depending from the top frame member 1a, and a bottom frame member 1b connected to frame members 2a and 2b that has a downwardly directed portion forming a stirrup 10. In the alternative and as shown in FIGS. 1 and 2, top frame member 1a and bottom frame member 1b may also be described as each having opposite ends spaced apart from one another at a defined distance, a horseshoe-shaped center, and a right angle bend near to each of its opposite ends, with the adjustment bores therethrough positioned between each right angle bend and the opposite end closest thereto. In a similar manner, as again shown in FIGS. 1 and 2, the two upright side frame members 2a and 2b may also each be described as having a top end, a bottom end, a right angle bend near said top end, and a right angle bend near said bottom end, with the two right angle bends on the same side frame members being formed in opposite directions to one another, so that when each bottom end is oriented in a forwardly-extending direction each top end becomes oriented in a rearwardly-extending direction, with adjustment bores therethrough positioned between each right angle bend and the opposed end closest thereto. As shown in FIG. 2, the present invention also has a substantially planar step 3 with two opposed and laterally positioned rear slots 6 each with an oblong configuration having a radius at both ends that allows insertion therethrough of the substantially horizontally-extending portion of side frame members 2a and 2b. With frame members 2a and 2b inserted through slots 6, step 3 is fixed securely into its usable position without additional fastening means between step 3 and frame members 2a and 2b. Step 3 also has a rear notch/cutout-area 11 configured for wheel nut 9 clearance so that when the weight of a mechanic is placed upon step 3, the additional contact of the rear portions of step 3 adjacent to notch/cutout-area 11 with tire 8 (as shown in FIG. 2) further establishes secure positioning for the present invention.

The frame members 1a, 2a, 2b, and 1b are preferably made from sturdy metal or plastic, including stainless steel, while the step 3 is preferably made from stainless steel, plastic, wood, rubber, rubber-coated wood, solid materials, textured materials, non-slip materials, high-friction materials, and mesh. Step 3 is typically positioned at a height equivalent to the center of the tire 8 over which it is secured, although not limited thereto. The notch/cutout-area 11 is configured for wheel nut 9 clearance to accommodate such central tire 8 positioning of step 3.

FIG. 1 shows the most preferred embodiment of the present invention having a closed loop tubular frame made from four main parts that include a top frame member 1a, a left side frame member 2a, a right side frame member 2b, and a bottom frame member 1b with a downwardly depending portion that forms a stirrup 10. FIG. 1 also shows tubular frame 1a, 2a, 2b, 1b mounted over the top of a tire 8 and supporting a step 3. As shown in FIG. 2, it is contemplated only for the downwardly depending portion of top frame member 1a and step 3 to be in contact with tire 8. Upper bores 7 near to each of the ends of top frame member 1a allow separation of top frame member 1a from left side frame member 2a and right side frame member 2b for compact storage thereof. When multiple upper bores 7 are present, as shown in FIG. 2, the present invention becomes adjustable for differing tire 8 widths. Further, lower bores 7 near to each of the ends of bottom frame member 1b also allow separation of bottom frame member 1b from left side frame member 2a and right side frame member 2b for compact storage. However, separation of bottom frame member 1b from left side frame member 2a and right side frame member 2b also has an additional purpose. The lower bores 7 allow the lower ends of left side frame member 2a and right side frame member 2b to each be inserted through a different one of the elongated lateral slots 6 in step 3, so that step 3 becomes secured in place by a user's weight and requires no additional fasteners between it and frame members 2a, 2b, or 1b. FIG. 1 further shows step 3 having a rearwardly positioned elongated notch or cutout-area 11 that is configured for wheel nut 9 clearance. The depth dimension, configuration, length dimension, and positioning of notch/cutout-area 11 can differ from that shown in FIG. 1. Should wheel nut 9 clearance not be an issue, notch/cutout-area 11 could be eliminated. The amount of overlap of step 3 laterally beyond frame members 2a, 2b, and 1b is also not critical, and may differ from that shown in FIG. 1 as long as the overlap is not so large or so unbalanced as to make step 3 unsafe for a user (not shown). In addition and in broken lines since they are positioned under step 3, FIG. 1 shows two pins 4 and two clips 5, used for engaging lower bores 7 to secure bottom frame member 1b to left side frame member 2a and bottom frame member 1b to right side frame member 2b. The use of pins 4 and clips 5 are preferred but not critical, and it is also contemplated for other sturdy and preferably quick-release fasteners to also be used. Although not shown, pins 4 and clips 5 can be used to engage upper bores 7, even though it is contemplated for any sturdy and easy-to-release fastener to be used through upper bores 7 as long as its configuration protects against the possibility of unanticipated premature release. To assemble pins 4 and clips 5, it is contemplated for each clip 5 used to be inserted through the hole 12 (shows in FIG. 2) near one end of pin 4 after pin 4 has been inserted through upper or lower bores 7, making pin 4 quickly and easily releasable, but only after clip 5 is deliberately removed. The slots 6 in step 3 should not be oversized to allow significant lateral of frame members 2a and 2b therein so that step 3 becomes securely fixed in position once the weight of a user is applied. The letter "c" is used to denote the distance between left side frame member 2a and right side frame member 2b, which would be determined in part according to the diameter of tire 8 used for mounting the present invention.

To assemble the most preferred embodiment of the present invention, top frame member 1a is connected via bores 7 and fasteners, such as but not limited to pins 4 and clips 5, to left side frame member 2a and right side frame member 2b, taking into account the width of the tire 8 contemplated for use in supporting the present invention, so that when a user is positioned upon step 3, top frame member 1a and step 3 are in secure contact with tire 8. Before bottom frame member 1b is connected to the lower ends of left side frame member 2a and right side frame member 2b, step 3 is placed at an acute angle relative to frame members 2a and 2b for insertion of the lower ends thereof through slots 6. Thereafter, bottom frame member 1b is connected to the lower ends of frame members 2a and 2b via pins 4 and clips 5, or other appropriate fasteners (not shown). The steps of inserting the lower ends of frame members 2a and 2b through step 3 can proceed or follow the connection of the upper ends of frame members 2a and 2b to top frame member 1a. When the present invention is oriented with top frame member 1a above bottom frame member 1b and frame members 2a and 2b in substantially vertically-extending positions, step 3 lays over frame members 2a, 2b, and 1b in a position substantially perpendicular to vertically-extending frame members 2a and 2b. No additional fasteners are needed between step 3 frame members 2a, 2b, and 1b to maintain it in a secure position once a user's weight is applied to its top surface. Separation of the bottom frame member 1b from left side and right side frame members 2a and 2b, is critical for inserting frame members 2a and 2b through slots 6. While the separation of top frame member 1a from left side and right side frame members 2a and 2b is not critical, it is preferred to accommodate differing tire 8 widths. The elongated configuration of slots 6 permits insertion of left side frame member 2a and right side frame member 2b through slots 6 while step is in an at least partially raised orientation. Also, it is preferred for the pins 4, clips 5, and/or other fasteners used to require no tools for the assembly and disassembly of the present invention. Although FIG. 1 shows one bore 7 each in the lower ends of left side frame member 2a and right side frame member 2b and the opposing ends of bottom frame member 1b, more than one bore 7 could be used. The length and width dimensions of step 3 relative to left side frame member 2a, right side frame member 2b, and bottom frame member 1b can be different from that shown in FIG. 1. Also, the diameter dimensions of frame member 1a, 1b, 2a, and 2b relative to step 3 can be different from that shown in FIG. 1. Further, although FIG. 1 shows top frame member 1a and bottom frame member 1b having a larger diameter dimension than left side frame member 2a and right side frame member 2b, so that the ends of left side frame member 2a and right side frame members 2b can be inserted into the opposing ends of top frame member 1a and bottom frame member 1b, the reverse is also contemplated. The length dimensions of left side frame member 2a and right side frame member 2b are generally determined so as to place step 3 approximately at a height equivalent to the center of the tire 8 over which it is secured. With the exception of the number of upper and lower bores 7 used and with the goal of compact storage, in the most preferred embodiment of the present invention it is preferred for top frame member 1a to have a nearly identical configuration to that of bottom frame member 1b, and for left side frame member 2a to have a nearly identical configuration to that of right side frame member 2b, as shown in FIG. 1, although the configuration of bottom frame member 1b is not limited to that of top frame member 1a.

FIG. 2 also shows the most preferred embodiment of the present invention positioned over a tire 8. The adjustment of top frame member 1a relative to side frame members 2a and 2b is such that only frame member 1a and step 3 are in close association with tire 8. Further, FIG. 2 shows the pin 4 preferred for the connection of frame members 2a and 2b to the bottom frame member 1b, and the hole 12 through pin 4 that is needed for securing pin 4 with the clip 5 shown in FIG. 1 within the bores 7 shown frame members 1a, 2a, 2b, and 1b. In addition, FIG. 2 shows step 3 in two positions, a raised position appropriate for the initial insertion of the lower ends of frame members 2a and 2b through slots 6, and a lowered horizontally-extending position of use. By way of example and not limited thereto, frame members 1a and 1b in the most preferred embodiment would be similar in configuration and could each be made from tubing having an outside diameter of one-and-one-half inches and an inside diameter of one-and-one-fourth inches. In contrast, frame members 2a and 2b in the most preferred embodiment would be similar in configuration and correspondingly be made from tubing having an outside diameter of one-and-one-fourth inches and an inside diameter of one inch. It is preferable that frame members 1a, 2a, 1b, and 2b be made from sturdy metal materials. Preferred materials for step 3 include reinforced plastic and aluminum plate, however, length, width, and thickness dimensions would vary. Although the size of step 3 is determined by the application and may vary, one example of dimensions appropriate for at least one embodiment of the present invention step 3 include a length dimension of approximately forty-two inches, a width dimension of approximately fourteen inches, and a thickness dimension of approximately one inch. In addition, for at least one preferred embodiment of the present invention pin 5 would have a diameter dimension of approximately one inch. Further, when multiple bores 7 are used in frame members 1a, 2a, and 2b for tire width adjustment, in the most preferred embodiment of the present invention, multiple bores 7 are contemplated in the outer frame members only, with the remaining frame members 1a, 2a, or 2b having as little as one bore 7 each. Also, as previously mentioned, although FIG. 1 shows frame members 1a and 1b being made from larger diameter tubing, in the alternative frame members 1a and 1b can have smaller diameter dimensions than frame members 2a and 2b, and fit within frame members 2a and 2b for secure connection with pins 4, clips, 5, and/or other fasteners (not shown).

What is claimed is:

1. A suspended step device that is configured for attachment over and support by a motor vehicle tire secured in place by wheel nuts and which can be used to support a mechanic needing an elevated position to work in the vehicle's engine compartment and other users needing access to the upper portions of high-profile vehicles, said step device comprising:

two upright tubular side frame members each having a top end, a bottom end, a right angle bend near said top end, and a right angle bend near said bottom end, with said two right angle bends on the same one of said side frame members being formed in opposite directions to one another, so that when each said bottom end is oriented in a forwardly-extending direction each said top end becomes oriented in a rearwardly-extending direction, said side frame members each further having at least one pair of adjustment bores therethrough positioned between each said right angle bend and a respective end closest thereto;

a tubular top frame member and a tubular bottom frame member each having opposite ends spaced apart from one another at a defined distance, a horseshoe-shaped center, and an additional right angle bend near to each of said opposite ends, said top frame member and said bottom frame member each further having at least one pair of adjustment bores therethrough positioned between each said right angle bend and the one of said opposite ends closest thereto;

a step platform having a length dimension greater that its width dimension and two rearwardly positioned oblong slots in perpendicular orientation to said length dimension, each of said oblong slots having a radius at both of its ends, each of said oblong slots also laterally spaced apart from one another at a distance equivalent to said defined distance between said opposite ends of said bottom frame member; and at least four fasteners configured and dimensioned for engaging said adjustment bores through said side frame members, said top frame member, and said bottom frame member, so that when said fasteners are used to achieve interlocking connection between each of said opposite ends of said top frame member to said top end of a different one of said side frame members, when said bottom ends of said side frame members are each threaded through a different one of said oblong holes in said step platform, and when additional ones of said fasteners are used to achieve interlocking connection between each of said bottom ends of said side frame members and a different one of said opposite ends of said bottom frame member, a closed-loop frame is thereby formed wherein said horseshoe-shaped center of said bottom frame member extends in a downwardly direction for use as a stirrup, and when said horseshoe-shaped center of said top frame member is positioned behind a motor vehicle tire and said step platform is in a horizontally-extending orientation against said closed-loop frame, said step platform engages the motor vehicle tire while said side frame members remain spaced apart from the motor vehicle tire, whereby said step platform is able to provide a secure surface upon which a mechanic and other users can stand, with the insertion of said side frame members through said oblong slots in said step platform being the only means of connection between said step platform and said closed loop tubular frame.

2. The device of claim 1 wherein said step platform has a rear cutout area configured for clearance of wheel nuts.

3. The device of claim 1 wherein said top frame member, said side frame members, and said bottom frame member each have at least two of said adjustment bores configured for making said tubular closed loop frame adjustable for differing tire width.

4. The device of claim 3 wherein said top frame member and said bottom frame member are identical in shape and form, and interchangeable with one another.

5. The device of claim 1 wherein said two side frame members are identical in shape and form, and interchangeable with one another.

6. The device of claim 1 wherein said two side frame members are identical in shape and form, and interchangeable with one another, and said top frame member and said bottom frame member are also identical in shape and form, and interchangeable with one another.

7. The device of claim 1 wherein said fasteners are quick-release fasteners.

8. The device of claim 7 wherein said quick release fasteners are selected from a group consisting of pins and clips.

9. The device of claim 1 wherein said step platform is made from materials selected from a group consisting of stainless steel, plastic, wood, rubber, rubber-coated wood, solid materials, textured materials, non-slip materials, high-friction materials, and mesh.

10. The device of claim 1 wherein said tubular closed-loop frame is made from materials selected from a group consisting of metal and plastic.

11. A method for providing access for a mechanic to a vehicle's engine compartment and for others to reach upper portions of high-profile vehicles, said method comprising the steps of:

providing a closed-loop tubular frame having two upright tubular side frame members each having a top end, a bottom end, a right angle bend near said top end, and a right angle bend near said bottom end, with said two right angle bends on the same one of said side frame members being formed in opposite directions to one another, so that when each said bottom end is oriented in a forwardly-extending direction each said top end becomes oriented in a rearwardly-extending direction, said side frame members each further having at least one pair of adjustment bores therethrough positioned between each said right angle bend and the one of said opposed ends closest thereto; a tubular top frame member and a tubular bottom frame member each having opposite ends spaced apart from one another at a defined distance, a horseshoe-shaped center, and an additional right angle bend near to each of said opposite ends, said top frame member and said bottom frame member each further having at least one pair of adjustment bores therethrough positioned between each said right angle bend and the one of said opposite ends closest thereto; a step platform having a length dimension greater that its width dimension and two rearwardly positioned oblong slots in perpendicular orientation to said length dimension, each of said oblong slots having a radius at both of its ends, each of said oblong slots also laterally spaced apart from one another a distance equivalent to said defined distance between said opposite ends of said bottom frame member; at least four fasteners configured and dimensioned for engaging said adjustment bores through said side frame members, said top frame member, and said bottom frame member, and a tire secured to a motor vehicle via wheel nuts;

removing said fasteners attached between each of said side frame members and said bottom frame member;

separating said side frame members from said bottom frame member;

connecting said step platform to each said side frame member through use of a different one of said oblong slots;

using said fasteners to reconnect each said side frame member to said bottom frame member to reconstruct said closed-loop frame;

placing said step platform into a substantially horizontally-extending orientation over and against said close-loop frame, and placing said top frame member over said motor vehicle tire whereby said step platform will engage said tire while said side members will each remain separated distance from said tire, and further whereby said horizontally-extending step platform provides a secure surface upon which mechanics and users can be supported with the insertion of said side frame members through said oblong slots in said step platform being the only means of connection between said step platform and said closed-loop tubular frame.

12. The method of claim 11 wherein said step platform has a rear cutout area configured for clearance of wheel nuts.

13. The method of claim 11 wherein said top member, said side frame members, and said bottom frame member each have at least two of said adjustment bores configured for making said tubular closed-loop frame adjustable for differing tire width.

14. The method of claim 13 wherein said side frame members are identical in shape and form, and interchangeable with one another.

15. The method of claim 11 wherein said top frame member and said bottom member are identical in shape and form, and interchangeable with one another.

16. The method of claim 11 wherein said two side frame members are identical in shape and form, and interchangeable with one another, and said top frame member and said bottom frame member are also identical in shape and form, and interchangeable with one another.

17. The method of claim 16 wherein said fasteners are quick-release fasteners.

18. The method of claim 17 wherein said quick release fasteners are selected from a group consisting of pins and clips.

19. The method of claim 11 wherein said step platform is made from materials selected from a group consisting of stainless steel, plastic, wood, rubber, rubber-coated wood, solid materials, textured materials, non-slip materials, high-friction materials, and mesh.

20. The method of claim 11 wherein said tubular closed-loop frame is made from materials selected from a group consisting of metal and plastic.

* * * * *